(12) United States Patent
Ogino (10) Patent No.: US 6,802,011 B1
(45) Date of Patent: Oct. 5, 2004

(54) COPYRIGHT PROTECTION INFORMATION PROTECTING METHOD, INFORMATION SIGNAL PROCESSING METHOD, INFORMATION SIGNAL REPRODUCING METHOD, INFORMATION SIGNAL RECORDING METHOD, AND INFORMATION SIGNAL PROCESSING DEVICE, INFORMATION SIGNAL REPRODUCING DEVICE, AND INFORMATION SIGNAL RECORDING DEVICE

(75) Inventor: Akira Ogino, Tokyo (JP)

(73) Assignee: Sony Corporation, Tokyo (JP)

( * ) Notice: Subject to any disclaimer, the term of this patent is extended or adjusted under 35 U.S.C. 154(b) by 872 days.

(21) Appl. No.: 09/629,716

(22) Filed: Jul. 31, 2000

(30) Foreign Application Priority Data

Jul. 30, 1999 (JP) ............................................. 11-216834

(51) Int. Cl.[7] .......................... G06F 12/14; G06F 17/60; H04L 9/00
(52) U.S. Cl. .......................... 713/200; 713/176; 705/54; 705/57
(58) Field of Search ................................ 713/176, 150, 713/164, 165, 168, 189, 193, 194, 200; 382/100; 386/94; 380/34, 203, 232, 200; 430/313; 348/222.1; 705/50, 51, 52, 54, 57–59

(56) References Cited

U.S. PATENT DOCUMENTS 6,263,086 B1 * 7/2001 Wang ......................... 382/100
6,278,836 B1 * 8/2001 Kawara et al. ................ 386/94
6,314,518 B1 * 11/2001 Linnartz ...................... 713/176
6,456,726 B1 * 9/2002 Yu et al. ..................... 382/100
6,463,162 B1 * 10/2002 Vora ........................... 382/100
6,522,767 B1 * 2/2003 Moskowitz et al. ......... 382/100
6,546,113 B1 * 4/2003 Lucas et al. ................. 382/100
6,618,484 B1 * 9/2003 Van Wie et al. ............. 380/232
6,654,327 B2 * 11/2003 Kobayashi ............... 369/53.21
6,671,386 B1 * 12/2003 Shimizu et al. ............. 382/100
6,704,431 B1 * 3/2004 Ogawa et al. ............... 382/100
6,707,465 B2 * 3/2004 Yamazaki et al. ........... 345/629

OTHER PUBLICATIONS

Shiozaki et al, "Method of embedding robust watermarks into digital images", Dec. 1999, System and Computers, dialog text search, citation from abstract.*

"Proposal on digital data protection", Feb. 20, 1998, legal-minds.lp.findlaw.com/list/e–carm/msg00592.html, p. 1–2.*

* cited by examiner

Primary Examiner—Ayaz Sheikh
Assistant Examiner—Christopher Revak
(74) Attorney, Agent, or Firm—Jay H. Maioli (57) ABSTRACT

At the time of performing signal processing of information signals to which copyright protection information has been added, signal processing which would make detection of copyright protection information difficult or impossible is restricted, based on the copyright protection information detected from the information signals. Thus, even in the event that the information signals pass through a device having a signal processing unit which would make detection of copyright protection information difficult or impossible, copyright protection can be performed in a sure and inexpensive manner.

18 Claims, 9 Drawing Sheets

COPYRIGHT PROTECTION INFORMATION PROTECTING METHOD, INFORMATION SIGNAL PROCESSING METHOD, INFORMATION SIGNAL REPRODUCING METHOD, INFORMATION SIGNAL RECORDING METHOD, AND INFORMATION SIGNAL PROCESSING DEVICE, INFORMATION SIGNAL REPRODUCING DEVICE, AND INFORMATION SIGNAL RECORDING DEVICE

BACKGROUND OF THE INVENTION

1. Field of the Invention

The present invention relates to a method for protecting copyright protection information added to information signals by electronic watermark processing or the like for example, an information signal processing method, an information signal reproducing method, an information signal recording method, and to an information signal processing device, an information signal reproducing device, and an information signal recording device.

2. Description of the Related Art

In recent years, widespread dissemination of digital contents via the Internet, digital video disks, and so forth, has brought about the problem of copyright infringements regarding contents such as pictures and audio, due to unauthorized duplication (copying).

In order to prevent such copyright infringement problems, ways for adding copyright protection information such as copy control information to the contents and preventing unauthorized copying using this added information is being considered.

Such copyright protection information must be added to the information signals in a state of being difficult to alter illegally and difficult to remove from the information signals, in order to effectively prevent unauthorized copying.

Electronic watermark processing is expected to be able to satisfy this requirement. This electronic watermark processing involves a process for embedding information and the like for copyright protection as noise into portions of movie data or music data which are not important to human perception, i.e., portions that are redundant regarding the music or movie data. A specific example of this is spectrum diffusion, wherein information is added and detected using key patterns generated using random numbers, M period sequences, and so forth.

Such information for copyright protection serving as added information embedded in picture data or music data by electronic watermark processing is not readily deleted from the picture data or music data, and altering the copyright protection information is difficult. On the other hand, the embedded added information can be detected from the picture data or music data, even after the picture data or music data has been subjected to filtering processing or data compression processing.

It is expected that effective copyright protection means can be realized by the superimposing processing of copyright protection information onto information signals such as picture signals and the like using the above electronic watermark processing, such as preventing altering so that unauthorized copying can be prevented in a sure manner, copyright protection information can be detected from the electronic watermark so that unauthorized copies can be tracked down, and so forth.

However, with conventional reproducing devices and recording devices, all functions provided to the devices have been usable. Nevertheless, some of the signal processing functions provided to the reproducing devices and recording devices alter the format of the electronic watermark processing with regard to the copyright protection information added to the information signals by electronic watermark processing, resulting in a problem wherein the copyright protection information in the electronic watermark cannot be detected.

For example, in the event that electronic watermark information is superimposed on picture information by performing spectrum dispersion of copyright protection information using random numbers, executing zoom processing on all or part of the image existing in the reproducing device results in interpolation of pixels and horizontal lines, meaning that even using spectrum inverse dispersion will not allow detection of the copyright protection information.

Of course, the copyright protection information in the electronic watermark can be detected if the picture can be restored to the state of the picture signals before the zoom processing was executed, but generally the rate of zooming processing is not known at the time of detecting the copyright protection information, so there is the need to try detecting with several zoom rates by trial-and-error, resulting in massive circuit scales, and extended time spans needed for the detection processing.

In addition to the zoom processing, there are other types of processing which result in changes in the number of pixels or the number of lines, the position of pixels or the position of lines, or interpolation or pruning, such as reduction processing which reduces the size of the image, rotation processing which rotates the image centered on a certain point, inversion processing which inverts the image on a horizontal or vertical axis or on a point, cropping processing which crops away a portion of the image, image shifting processing wherein the displayed position of the image is changed, and so forth. Execution of any of these can result in detection of the added copyright protection information becoming difficult, or, depending on the signal processing, correct detection of copyright protection information may become completely impossible.

In order for detection of copyright protection information to be realized for all such signal processing, a copyright protection method must be developed which deals with these; yet there is also the concern of increasing the scale of detecting circuits thereby.

SUMMARY OF THE INVENTION

The present invention has been made in light of the above, and accordingly, it is an object thereof to enable copyright protection in a sure and inexpensive manner, without developing a new copyright protection method.

To this end, according to a first aspect of the present invention, a signal processing method, wherein signal processing is performed on information signals to which copyright protection information has been added, detects the copyright protection information from information signals, and performs control restricting signal processing making detection of the copyright protection information is difficult or impossible, based on the detected copyright protection information.

According to a second aspect of the present invention, an information signal reproducing method reads out information signals to which copyright protection information has been added, detects the copyright protection information from the read information signals, performs control for restricting the processing on the information signals making detection of the copyright protection information difficult or impossible, based on the detected copyright protection information, and subjects the read information signals to predetermined signal processing, based on the control.

According to a third aspect of the present invention, an information signal recording method detects the copyright protection information from the information signals, performs control for restricting the processing on the information signals making detection of the copyright protection information difficult or impossible, based on the detected copyright protection information, subjects information signals to which the copyright protection information has been added to predetermined signal processing, based on the control, and records information signals subjected to the signal processing.

According to a fourth aspect of the present invention, an information signal output method detects the copyright protection information from the information signals, performs control for restricting the processing on the information signals wherein detection of the copyright protection information is difficult or impossible, based on the detected copyright protection information, subjects information signals to which the copyright protection information has been added to predetermined signal processing, based on the control, and outputs information signals subjected to the signal processing.

According to a fifth aspect of the present invention, a signal processing device for subjecting information signals to which copyright protection information has been added to signal processing, comprises: detecting means for detecting the copyright protection information from information signals; and control means for performing control restricting image processing making detection of the copyright protection information difficult or impossible, based on the detection output of the detecting means.

According to a sixth aspect of the present invention, an information signal reproducing device comprises: reading means for reading out information signals to which copyright protection information has been added; signal processing means for subjecting the information signals read out by the reading means to predetermined signals processing; detecting means for detecting the copyright protection information from the information signals read out by the reading means; and controlling means for performing control for restricting the signal processing means in performing the processing on the information signals wherein detection of the copyright protection information by the detecting means is difficult or impossible, based on the copyright protection information that has been detected with the detecting means.

According to a seventh aspect of the present invention, an information signal recording device comprises: recording means for recording information signals to which copyright protection information has been added; signal processing means for subjecting information signals to which copyright protection information has been added to predetermined signal processing, prior to the recording process by the recording means; detecting means for detecting copyright protection information from the information signals; and controlling means for performing control for restricting the signal processing means in performing the processing on the information signals making detection of the copyright protection information by the detecting means difficult or impossible, based on the copyright protection information that has been detected with the detecting means.

According to an eighth aspect of the present invention, an information signal recording device comprises: output means for outputting information signals to which copyright protection information has been added; signal processing means for subjecting information signals to which copyright protection information has been added to predetermined signal processing, prior to the output by the output means; detecting means for detecting copyright protection information from the information signals; and controlling means for performing control for restricting the signal processing means in performing the processing on the information signals wherein detection of the copyright protection information by the detecting means is difficult or impossible, based on the copyright protection information that has been detected with the detecting means.

DESCRIPTION OF THE PREFERRED EMBODIMENTS

The following is a description of the embodiments of the present invention, with reference to the drawings.

The embodiments described below relate to reproducing devices and recording devices wherein copyright protection is primarily copy control, wherein the object of copy control is image information, and wherein optical disks such as DVDs (Digital Video Disks) are used as the recording medium.

Copy control information such as electronic watermark copyright protection information is superimposed on the picture signal at the time of base band signal, and the picture signals with the copyright protection information superimposed thereupon are compressed and encoded by the MPEG (Moving Pictures Experts Group) 2 method, and recorded on a DVD.

The copyright protection information is added to picture information composed of information signals, as electronic watermark information by electronic watermark processing. As for the electronic watermark processing in the present embodiment, PN (Pseudo-random Noise) sequence code (hereafter referred to as PN code) is used to perform spectrum dispersion of copy control information, and the copy control information subjected to spectrum dispersion is superimposed on the picture information as electronic watermark information WM.

In the case of the copy control method using this electronic watermark processing, the following four states are used to represent the copy generation and copy restriction state of the picture data or music data upon which the electronic watermark information has been superimposed by the embedded added information:

① Copy Free
② Copy Once (Copy one generation)
③ No More Copy
④ Never Copy

Now, ① "Copy Free", means that the picture data or music data can be freely duplicated. ② "Copy Once" (Copy one generation) means that there is permission to copy the picture data or music data, under the restriction that only one copy can be made. ③ "No More Copy" means that the picture data or music data is a copy of picture data or music data in the state of ② "Copy Once", and that further copying is forbidden. ④ "Never Copy" means that no copying from the original is permitted.

In the case of the copy generation control with this electronic watermark information WM, an arrangement is proposed wherein, in the event that the electronic watermark information superimposed on the picture data or music data is "Copy Once", recording devices capable of electronic watermark processing (i.e., capable of copy restricting processing) execute copy recording upon judging that the picture data or music data can be copied and recorded, and at the same time superimposes an electronic watermark information WM rewritten to "No More Copy" on the copied picture data or music data.

In this case, in the event that the electronic watermark information WM superimposed on the copied picture data or music data is "No More Copy", a recording device capable of electronic watermark processing can forbid execution of the recording, since copying of the picture data or music data is forbidden.

Figure 2:
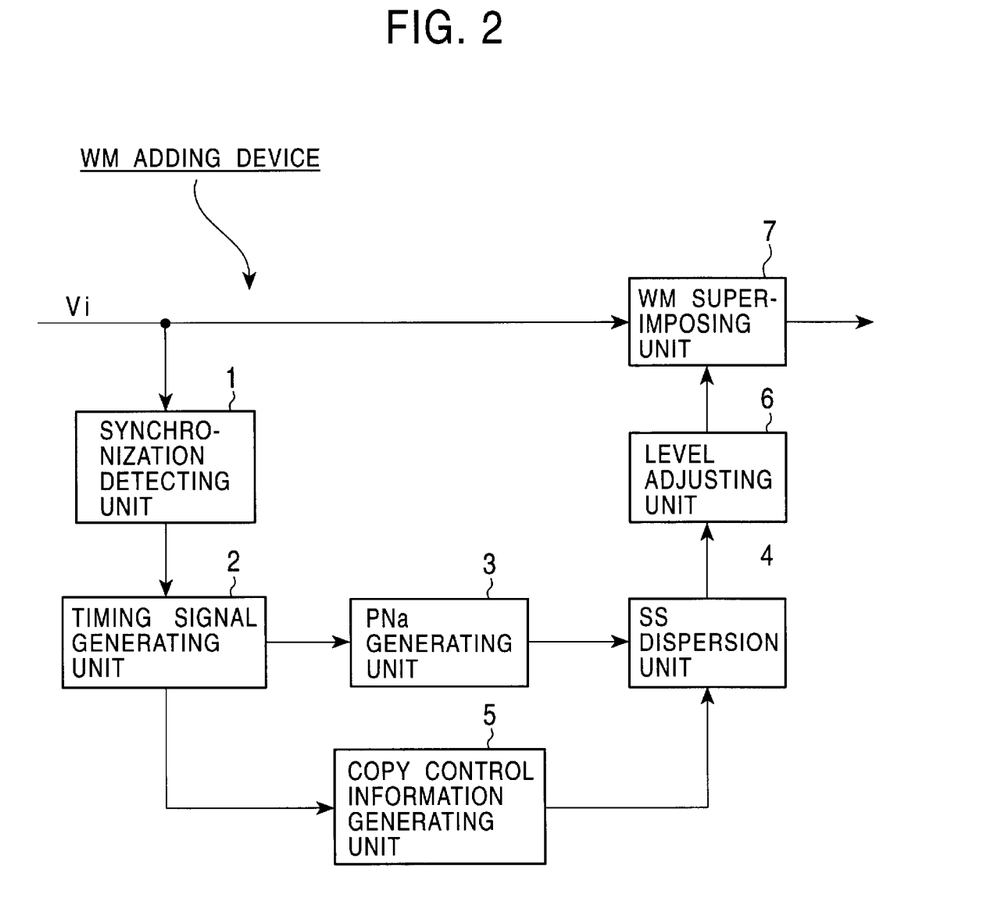
FIG. 2 is a diagram describing the superimposing method of copyright protection information with electronic watermark processing.

FIG. 2 is a block diagram describing the superimposing method of electronic watermark information WM on the picture signals in this case. In this example, the PN code to be used as dispersion code is generated at a sufficiently early cycle, and this is cast on the copy control information as added information so as to perform spectrum dispersion, so as to convert narrow-band high-level copy control information into wide-band minute-level signals which do not affect the picture signals. Then, this copy control information subjected to spectrum dispersion is superimposed on the picture signals and transferred.

For example, in FIG. 2, the vertical synchronization signal of the picture signal Vi is detected at the synchronization detecting unit 1, and the detection output is supplied to the timing signal generating unit 2. The timing signal generating unit 2 generates timing signals synchronized to the vertical synchronization signals.

The PNa generating unit 3 generates PN code string PNa which repeats at vertical cycles in this example, synchronously with the timing signals from the timing signal generating unit 2, and supplies the PN code string PNa to the SS dispersion unit 4 ("SS" used to refer to spectrum dispersion, hereafter).

Also, synchronously with the timing signals from the timing signal generating unit 2, the copy control information generating unit 5 generates copy control information to be superimposed on the picture signal Vi as electronic watermark information WM, and supplies the control information to the SS dispersion unit 4. In this case, the copy control information to be superimposed is determined according to the information to be transferred, and information having meaning such as "Copy Free", "Copy Once", "Never Copy", etc., is generated.

The SS dispersion unit 4 multiplies the copy control information and the PN code string PNa to generate spectrum dispersion signals. Then, the spectrum dispersion signals are supplied to the electronic watermark information WM superimposing unit 7 via the level adjusting unit 6, thereby superimposing the generated spectrum dispersion signals as electronic watermark information WM on the input picture signals Vi. The level adjusting unit 6 is for adjusting the superimposing level such that the reproduced image does not deteriorate from the superimposing of the electronic watermark information WM. In this case, the SS electronic watermark information is superimposed at a level lower than the dynamic range of the picture signals.

Figure 3:
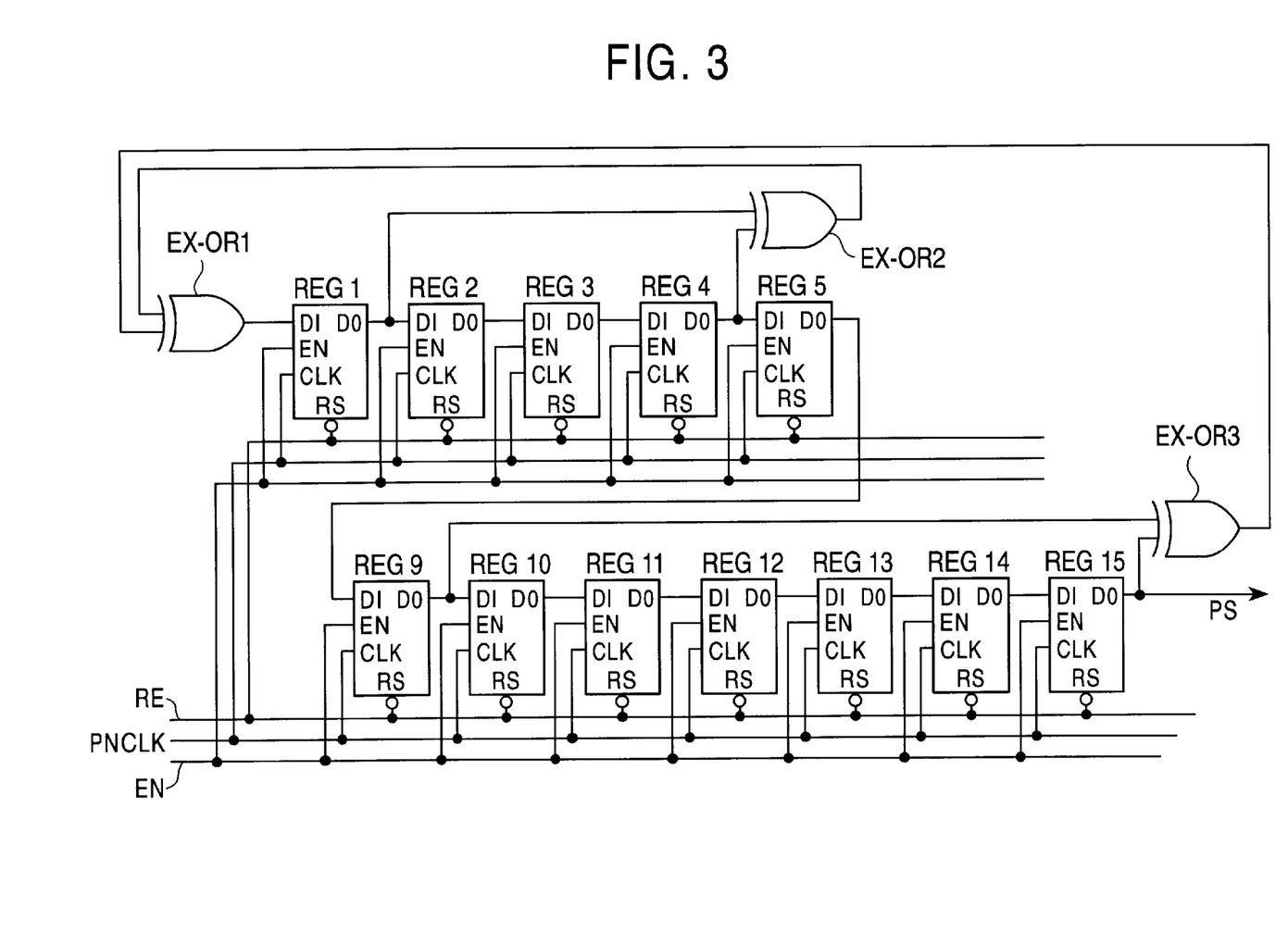
FIG. 3 is another diagram describing the superimposing method of copyright protection information with electronic watermark processing.

FIG. 3 is a diagram illustrating a configuration example of the PNa generating unit 3. This PNa generating unit 3 comprises 15 D flip-flops REG1 through REG15 making up a 15-tier shift register, and exclusive-OR circuits EX-OR1 through EX-OR3 which calculate appropriate tap output from this shift register. Then, the PNa generating unit 3 shown in FIG. 3 generates an M period sequence PN code string PS, based on the enable signal EN, PN clock signal PNCLK, and PN clock reset timing signal RE, generated synchronously with the timing signals from the timing signal generating unit 2.

In the case of this example in FIG. 3, electronic watermark information WM made up of spectrum dispersion signals with 4095 chips per vertical section is obtained. For example, if the clock rate is set to around 250 kHz, one cycle of the electronic watermark information WM is 4095/250= 16.38 and can be kept to around approximately one vertical section (16.7 ms). At this time, inputting a reset signal RE as an initializing signal with each vertical section allows the phase of the electronic watermark information to be matched, for each vertical cycle.

Figure 4A:
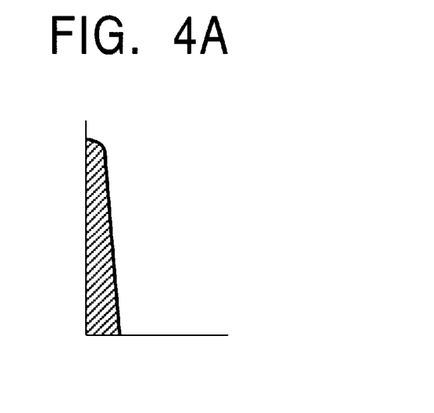
FIGS. 4A–4B are also diagrams describing the superimposing method of copyright protection information with electronic watermark processing.
Figure 4B:
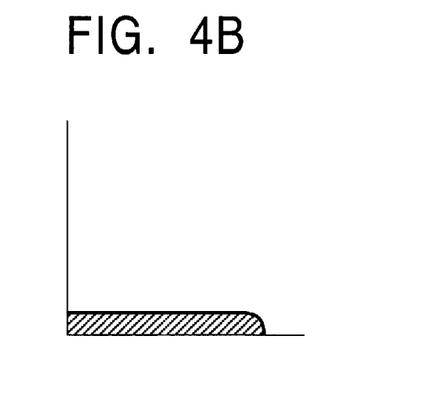

FIGS. 4A through 4D illustrate the relation between copy control information to be superimposed as electronic watermark information WM, and picture signals, with spectrum. The copy control information has little information amount contained therein, is a low bit rate signal, and is a narrow-band signal as shown in FIG. 4A. subjecting this to spectrum dispersion yields the wide-band signal shown in FIG. 4B. At this time, the spectrum dispersion signal level becomes smaller in inverse proportion to the ratio of expansion of the band.

Figure 4C:
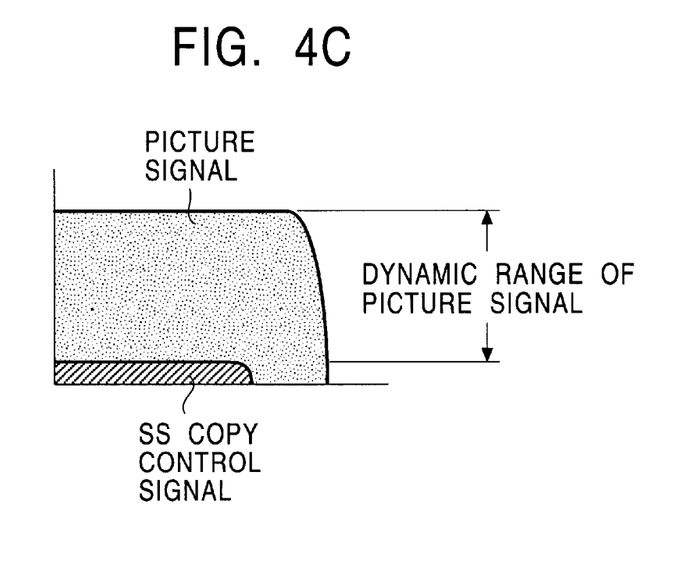

This spectrum dispersion signal, that is, the SS copy control information is superimposed on the picture signal Vi at the WM superimposing unit 7, and at this time, the SS copy control information is superimposed at a level smaller than the dynamic range of the picture signal which is the information signals, as shown in FIG. 4C. Such superimposing results in almost no deterioration of the main information signal. Accordingly, as described above, in the event that the picture signal with the SS copy control information superimposed thereupon is supplied to a monitor receiver, and the picture is reproduced, the effects of the SS copy control information are almost nonexistent, and a suitable reproduced image can be obtained.

Figure 4D:
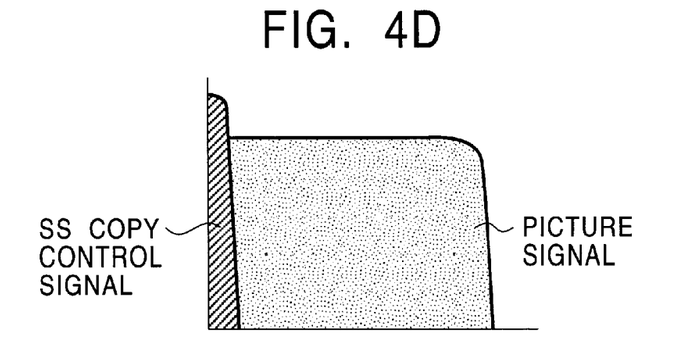

On the other hand, as described later, performing inverse spectrum dispersion to detect the SS copy control information restores the SS copy control information as a narrow band signal again, as shown in FIG. 4D. A sufficient band dispersion rate causes the electric power of the copy control information following inverse dispersion to exceed the information signals, thus enabling detection.

In this case, the electronic watermark information superimposed on the picture signal is superimposed within the same time and same frequency as the picture signal, so deletion or altering thereof with frequency filtering or simple information replacement is impossible.

Accordingly, the SS copy control information superimposed on the picture signal cannot be removed, and alteration thereof is difficult, thereby enabling copy control wherein unauthorized copying can be prevented in a sure manner.

Also, with the above configuration, spectrum dispersion is performed using the vertical cycle PN code string which takes the vertical cycle signals as the reference signals thereof, so the PN code string for inverse spectrum dispersion which is necessary at the time of detecting the spectrum dispersion signal from the picture image can be easily generated based on signals synchronized with the vertical cycle signals detected form the picture signal.

Also, the electronic watermark information WM is rewritten at the later-described recording device from "Copy Once" to "No More Copy", but with the present embodiment, spectrum dispersion is used for the electronic watermark processing, so the electronic watermark information in the "Copy Once" state does not disappear, rather, electronic watermark information in the "No More Copy" state is superimposed thereupon, using a different period sequence PN code for the PN code string used for spectrum dispersion.

Even with such being carried out, the copy control information subjected to spectrum dispersion is superimposed on the main information signal at an inconspicuous level, and individual copy control information can be detected since the PN code period sequences differ, so effects the same as rewriting can be obtained by judging the copy control information which is closer to forbidding copying as being the copy control information at that time. In the following description, the judgement output for the electronic watermark information WM check results means that the results judged therefrom are used in the event that multiple sets of copy control information are detected as in this case.

(Embodiment of Information Signal Reproducing Device)

Figure 1:
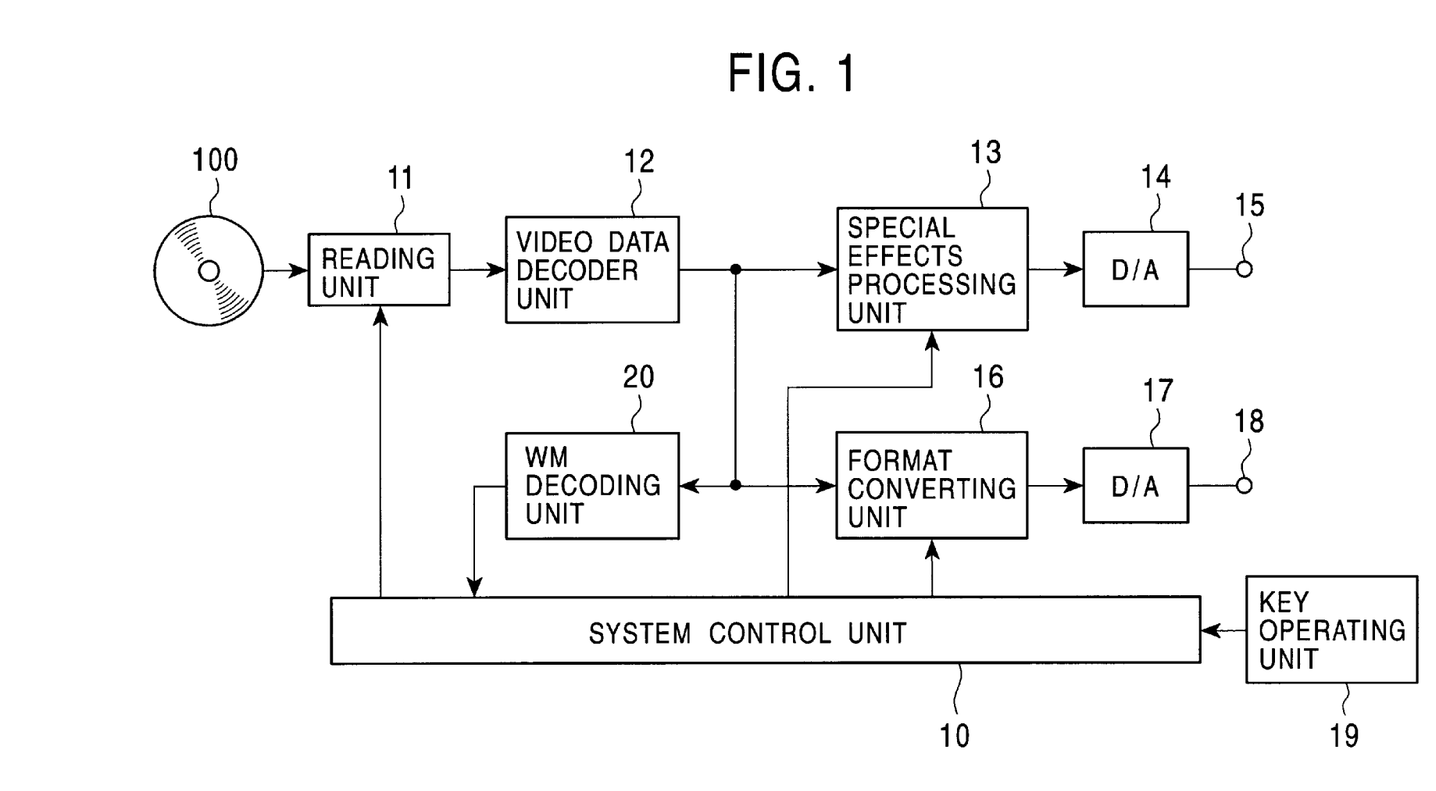
FIG. 1 is a block diagram illustrating an embodiment of the information signal reproducing device according to the present invention.

FIG. 1 is a block diagram of a DVD (Digital Video Disk) reproducing device serving as an embodiment of the information signal reproducing device according to the present invention. In FIG. 1, the disk 100 has recorded thereupon compressed and encoded picture signals, upon which is superimposed copy control information serving as the copyright protection information by the above electronic watermark processing. In this example, the picture signals recorded on the disk 100 are signals of a format called 480I (interlaced scanning of 480 valid scanning lines, with a horizontal frequency of 15.75 kHz).

The reading unit 11 reads out the compressed and encoded picture signals from the disk 100 in that state, and supplies these to the video data decoding unit 12. The video data decoding unit 12 expands and decodes the compressed and encoded picture signals. The expanded and decoded output is introduced to a first picture signal output terminal 15 via the special effects processing unit 13 and D/A conversion unit 14.

The special effects processing unit 13 performs special effects processing according instructions from the user from the key operating unit 19. The system control unit 10 receives selection instructions of the user from the key operating unit 19, and supplies the selection instruction signals to the special effects processing unit 13. The selection instruction signals include a normal mode state wherein the input picture signals are output as is, without any special effects processing.

Special effects processing capable of being performed at the special effects processing unit 13 in this example is, for example, zooming (enlarging), rotating, inverting, cropping, image shifting, etc., of the image. Many of such kinds of special effects processing involve changing of pixel positions and horizontal line positions, or changing of pixel numbers and horizontal line numbers (including interpolation and pruning processing), and there are cases wherein detection of electronic watermark information from the picture signals after such special effects processing becomes difficult or impossible.

Accordingly, with the present embodiment, of the special effects processing performed by the special effects processing unit 13 by control signals from the system control unit 10, special effects processing which makes detection of electronic watermark information difficult or impossible is restricted (i.e., execution of the processing is forbidden or otherwise restricted) based on detection information of electronic watermark information, as described later.

Also, the reproducing device according to the present embodiment has functions for converting the 480I format picture signals into a format called 480P (non-interlaced scanning of 480 valid scanning lines, with a horizontal frequency of 31.5 kHz). Thus, the output of the video data decoding unit 12 is supplied to the format converting unit 16, and format-converted from the 480I format to the 480P format. The picture signals following format conversion are introduced to a second picture signal output terminal 18, via the D/A converting unit 17.

This format conversion includes interpolation processing of horizontal lines and, in cases, interpolation processing of pixels, so detection of electronic watermark information from the picture signals after such conversion processing may be difficult or impossible. Accordingly, with the present embodiment, the system control unit 10 performs restriction control of format conversion processing based on detection output of the electronic watermark information, as described later.

As described above, the system control unit 10 judges whether or not to restrict special effects processing and format conversion processing, based on the detection output of electronic watermark copyright protection information. Accordingly, the expanded and decoded output of the video data unit 12 is supplied to the electronic watermark information WM decoding unit (hereafter referred to as "WM decoding unit") 20. This WM decoding unit 20 detects electronic watermark copyright protection information superimposed on the picture signals by performing spectrum inversion dispersion, which is the reverse process of the electronic watermark information WM adding process described above.

Figure 5:
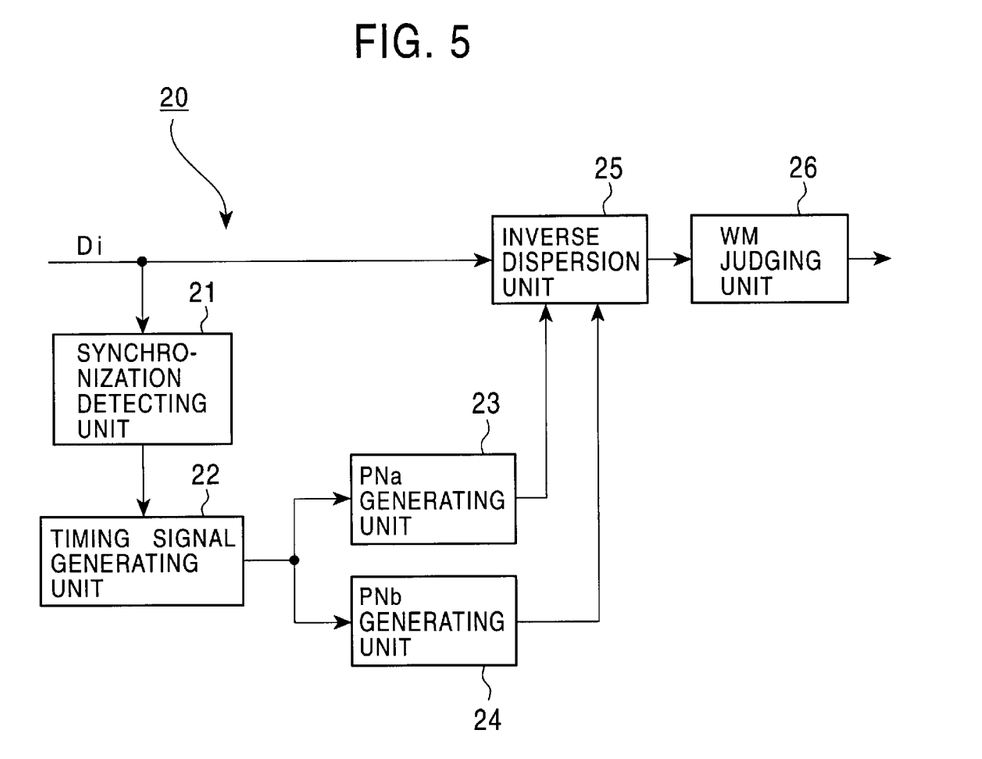
FIG. 5 is a block diagram describing the process of detecting electronic watermark copyright protection information from information signals.

The WM decoding unit 20 can be configured as shown in FIG. 5. That is, as shown in FIG. 5, the video data Di from the video data decoding unit 12 is supplied to the inverse dispersion unit 25, and is supplied to the synchronization detecting unit 21. The synchronization detecting unit 21 detects the vertical synchronization timing, and supplies the detection output to the timing signal generating unit 22.

The timing signal generating unit 22 supplies vertical synchronization timing signals to the PNa generating unit 23 and PNb generating unit 24. The PNa generating unit 23 generates the same PN code period sequence as the PNa generating unit 3 of the adding device in FIG. 2, so the PN code string PNa is generated at the same vertical synchronization timing as the adding device shown in FIG. 2. The PNb generating unit 24 is for detecting rewritten electronic watermark information WM at the later-described recording device, and generates a PN code string PNb which is the same as the PN code string PNb for rewriting at the recording device.

The PN code strings from the PNa generating unit 23 and PNb generating unit 24 are supplied to the inverse dispersion unit 25, thereby obtaining copy control information which had been subjected to spectrum dispersion. In this case, at the inverse dispersion unit 25, one to two sets of copy control information are detected by inverse dispersion by the two period sequence PN code strings PNa and PNb, and the sets of copy control information are supplied to the WM judging unit 26. At the WM judging unit 26, the information of the copy control information which is closer to forbidding copying is used for judgement output. Then, the judgment output thereof is supplied to the system control unit 10.

The system control unit 10 judges whether or not to restrict special effects processing and format conversion processing according to the judgement output of this copy control state, and generates control signals to be supplied to the special effects processing unit 13 and format converting unit 16. The special effects processing unit 13 and format converting unit 16 perform restricted control of signal processing, according to the control signals.

Figure 6:
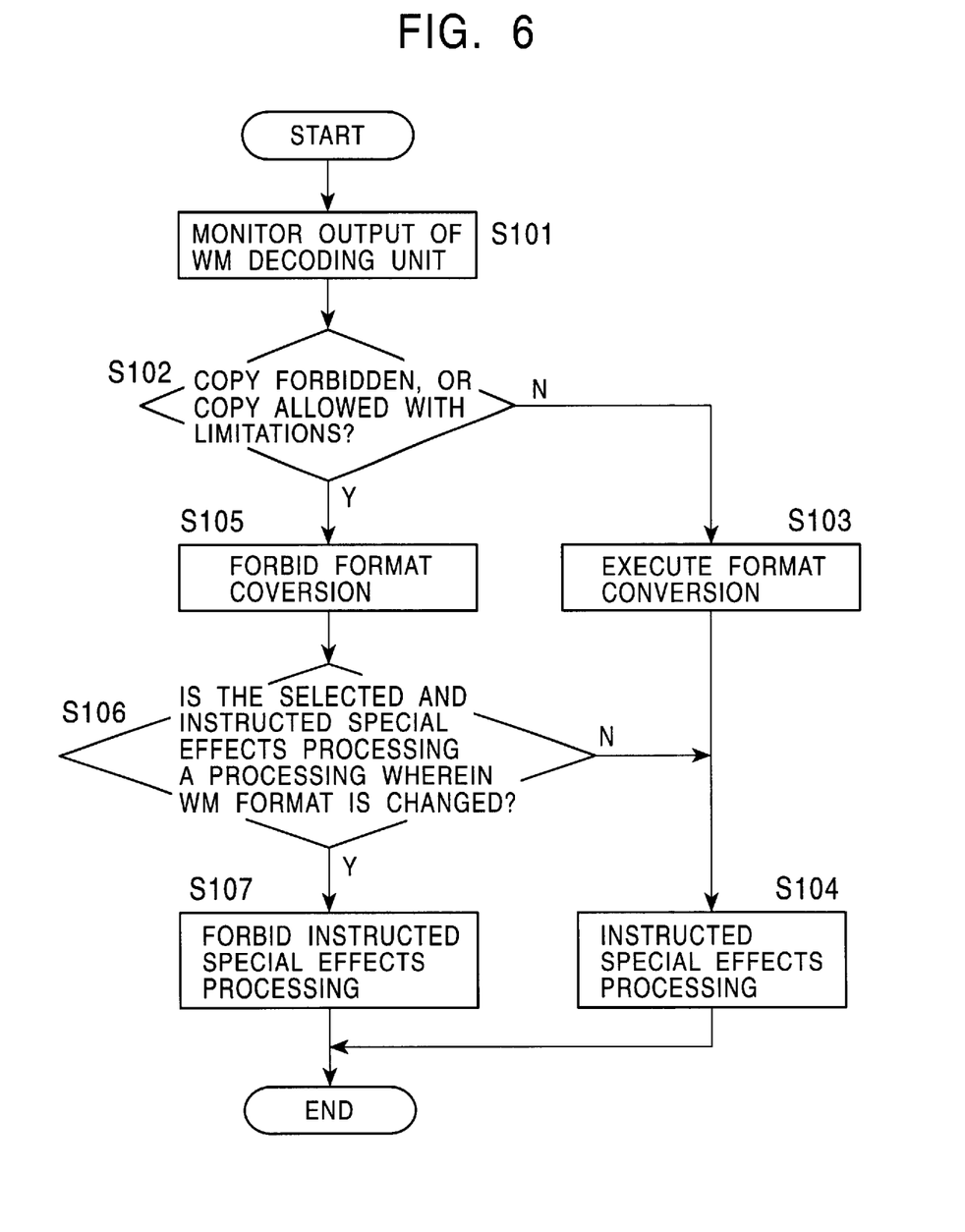
FIG. 6 is a flowchart for describing the operation of the principal portions of an embodiment of the information signal reproducing device according to the present invention.

FIG. 6 is a flowchart illustrating the flow of processing at the system control unit 10 at this time.

First, the detection output of electronic watermark information WM from the WM decoding unit 20 is monitored (step S101), and the copy control state regarding the reproduced picture signals is checked (step S102). In the event that the resulting copy control state is "Copy Free", the system control unit 10 permits the format converting unit 16 to execute format conversion and output picture signals following format conversion from the output terminal 18 (step S103). The system control unit 10 also permits execution of special effects processing instructed from the key operating unit 19 (step S104).

On the other hand, in the event that the copy control state in step S102 forbids copying ("Never Copy" or "No More Copy") or permits copying with limitations ("Copy Once"), the system control unit 10 sends control signals forbidding execution of format conversion processing to the format converting unit 16, thereby forbidding format conversion processing (step S105).

Also, judgement is made whether or not the special effects processing selected and instructed via the key operating unit 19 would change the format of the electronic watermark information WM (step S106), and in the event that this would not change the format of the electronic watermark information WM, the flow proceeds to step S104, and permits execution of the special effects processing. That is to say, judgement is made in step S106 whether executing of processing which would change the format of the electronic watermark information WM, e.g., signal processing involving changing of pixel positions and line positions or changing of pixel numbers and line numbers, interpolation processing, or pruning processing, has been instructed.

Also, in step S106, in the event that the selected and instructed special effects processing is such which would change the format of the electronic watermark information WM, execution of the instructed format of the electronic watermark information execution of the instructed special effects processing is forbidden (step S107), and the special effects processing unit 13 is controlled so as to output normal mode picture signals without the special effects processing. In this case, a message is added to the output picture signals such as "The selected instructed special effects processing is not available, due to copyright protection", in order to prevent the user from confusing the state with a malfunction of the device.

In this way, according to the reproducing device of the present embodiment, states wherein the electronic watermark information WM is not detected from the output signals from the reproducing device can be prevented, by restricting the execution of signal processing which would change the format of the electronic watermark information WM and make the electronic watermark information WM difficult or impossible to detect.

Accordingly, in the event of executing copying of the picture signals output from the relaying device, the copy control signals which are electronic watermark information are detected in a sure manner, and appropriate copy control is performed based on that detection output.

Of course, it goes without saying that the above processing described as special effects processing is only an example and the present invention is by no means restricted to this. It should be understood that signal processing which is restricted based on the detection output of electronic watermark copyright protection information is signal processing such that execution of the special effects processing thereof makes detection of the electronic watermark information from the picture signals following the special effects processing either difficult or impossible as described above.

Also, the processing with the above format converting unit 16 is only one example of format conversion, and arrangements wherein pruning of horizontal lines or pixels is performed as in the case of conversion from 480P to 480I, cases of conversion from 480P to HDTV 720P and 1080I, and inverse conversion thereof, are also objects of signal processing restriction.

Also, the signal processing which is restricted based on the detection output of the electronic watermark copyright protection information is not limited to the above-described special effects processing or format conversion processing; processing such as filtering processing which would change the format of the electronic watermark information is also the object of restriction. Further, any reproducing signals for reproducing at different speeds, such as fast play, slow play, still play, and so forth, which would change the format of the electronic watermark information, are also the object of restriction.

(Embodiment of Information Signal Recording Device)

Figure 7:
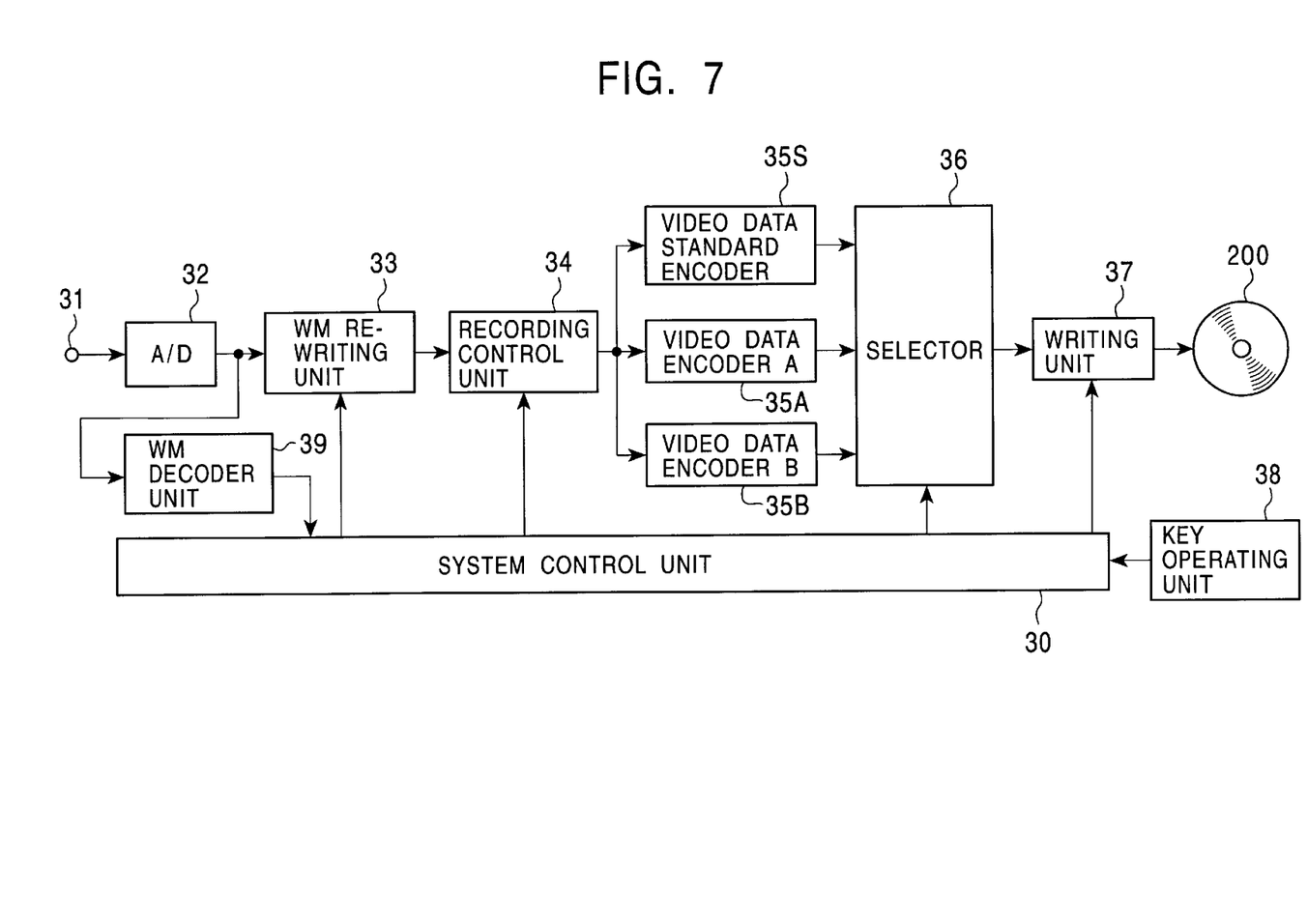
FIG. 7 is a block diagram illustrating an embodiment of the information signal recording device according to the present invention.

FIG. 7 is a block diagram of a DVD recording device serving as an embodiment of the information signal reproducing device according to the present invention. The DVD recording device according to the present embodiment has functions for performing video data compression encoding according to requests of the user, in addition to standard compression encoding processing for compressing and encoding without changing the format of the electronic watermark information WM, but there is restriction on compressing encoding processing wherein encoding would change the format of the electronic watermark information and make detection of the electronic watermark information from the expanded decoded picture signals difficult or impossible, in the event that copyright protection information is superimposed on the picture signals to be recorded and copying is forbidden or permitted with limitations.

In FIG. 7, the picture signals input via the input terminal 31 are converted into digital signals by the A/D converting unit 32, and then supplied to the electronic watermark information WM rewriting unit (hereafter referred to as "WM rewriting unit") 33. This WM rewriting unit 33 is for rewriting the electronic watermark information WM superimposed on the input picture signals from "Copy Once" to "No More Copy" under control of the system control unit 30 in the event that the decoding output of the WM decoding unit 39 shows that the electronic watermark information WM superimposed on the input picture signals is "Copy Once".

Figure 8:
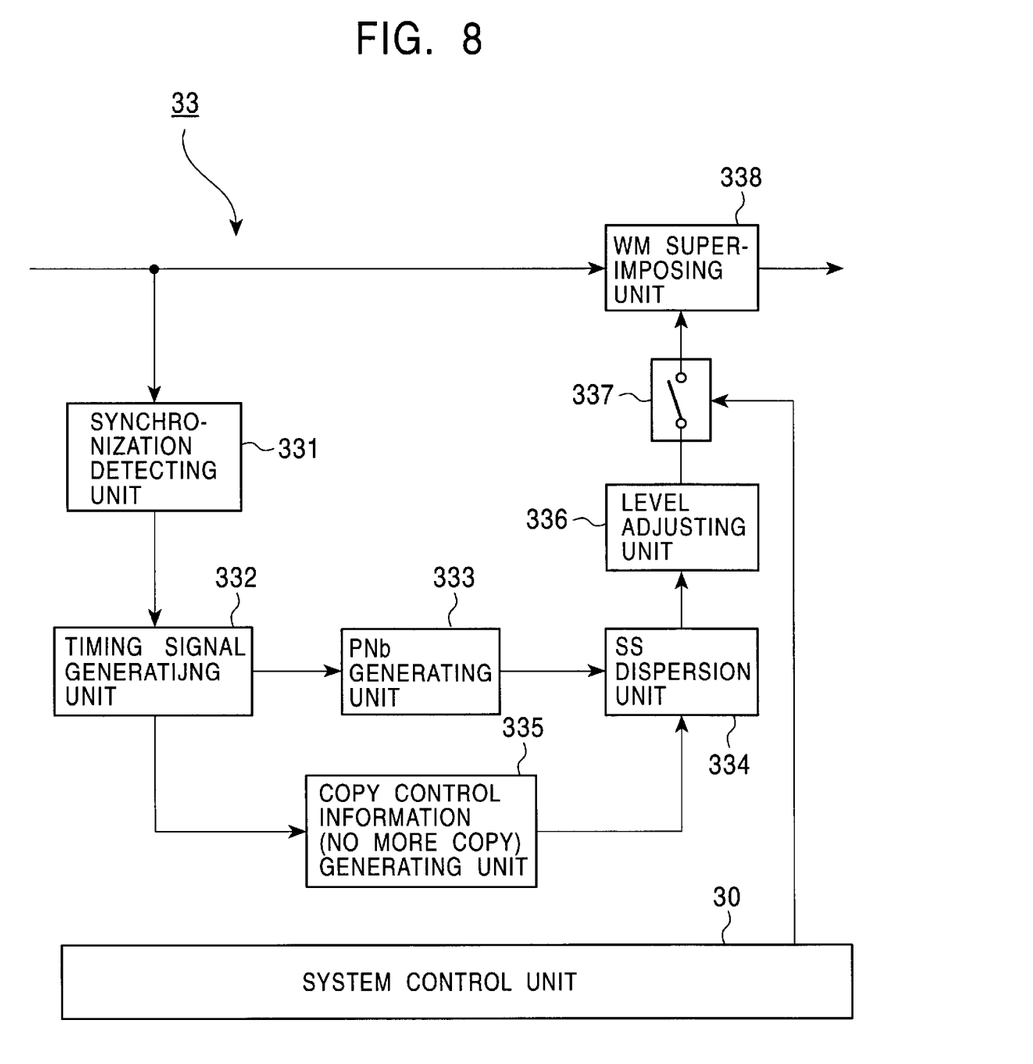
FIG. 8 is a block diagram for describing the copyright protection information rewriting processing with electronic watermark processing.

As described above, the electronic watermark information WM rewriting unit 33 uses spectrum dispersion for the electronic watermark processing in this embodiment, so new spectrum dispersion signals are superimposed. FIG. 8 is a configuration example of the electronic watermark information WM rewriting unit 33 in this case. This configuration is generally the same configuration as the electronic watermark electronic watermark information WM adding device shown in FIG. 2, except for several differences.

That is, the synchronization detecting unit 331, timing signal generating unit 332, SS dispersion unit 334, level adjusting unit 336, and WM superimposing unit 338 shown in FIG. 8 correspond to and have the same configuration as the synchronization detecting unit 1, timing signal generating unit 2, SS dispersion unit 4, level adjusting unit 6, and WM superimposing unit 7 shown in FIG. 2.

A first difference with the electronic watermark electronic watermark information WM adding device shown in FIG. 2 is that a switch circuit 337 is provided between the level adjusting unit 336 and WM superimposing unit 338, such that the switch circuit 337 is controlled to switch on only in the event that judgement has been made to execute recording and execute rewriting, by switching control signals from the control unit 30.

A second difference with the electronic watermark electronic watermark information WM adding device shown in FIG. 2 is that the PN code string for spectrum dispersion is different. That is, in FIG. 8, a PNb generating unit 333 is provided instead of the PNa generating unit 3 shown in FIG. 2, and generates a code string PNb which is different from the code string PNa.

A third difference with the electronic watermark electronic watermark information WM adding device shown in FIG. 2 is that the copy control information generating unit 335 differs from the copy control information generating unit 5 shown in FIG. 2, and only generates "No More Copy" information.

Incidentally, the electronic watermark information WM decoding unit 39 is configured exactly the same as the above-described WM decoding unit 20 of the reproducing device.

The output of the WM rewriting unit 33 is supplied to the recording control unit 34. The recording control unit 34 receives control signals from the system control unit 30, and performs control of whether to execute or forbid recording. The system control unit 30 generates recording control signals for controlling this recording control unit 34, based on the detection output of the electronic watermark information from the WM decoding unit 39.

That is, in the event that the decoding output of the WM decoding unit 39 judges that the copy control information of the electronic watermark forbids copying, the system control unit 30 supplies control signals forbidding recording to the recording control unit 34. Upon receiving these signals, the recording control unit 34 performs processing forbidding recording of the encoding-processed picture signals. That is, the picture signals are not sent to the later circuit portion.

Also, in the event that the decoding output of the WM decoding unit 39 has judged that the copy control information of the electronic watermark permits copying freely or permits copying with limitations, the system control unit 30 supplies control signals enabling executing of recording to the recording control unit 34. Upon receiving these signals, the recording control unit 34 sends the picture signals to the later encoding units 35S, 35A, and 35B.

The compression encoding processing at the video data standard encoder 35S allows copy control information superimposed as electronic watermark copyright protection information on picture signals to be detected in a sure manner following the decoding processing, as described above.

On the other hand, the encoding processing with the video data encoders 35A and 35B is processing wherein the copy control information superimposed as electronic watermark copyright protection information on picture signals is difficult or impossible to detect following the decoding processing.

The picture signals encoded by the encoders 35S, 35A, and 35B are supplied to the selector 36. This selector 36 selects the encoding output of one of the three encoders 35S, 35A, and 35B, based on selection control signals from the system control unit 30.

The system control unit 30 has input thereto selection instructions regarding which encoder to use, from the key operating unit 38. The system control unit 30 generates the selection control signals regarding which of the three encoders 35S, 35A, and 35B to use, based on the selection instructions, and supplies the selection control signals to the selector 36.

The encoded output selected by the selector 36 is supplied to the writing unit 37. The writing unit 37, upon receiving control of the system control unit 30, executes writing of picture signals to the disk 200 at the time of executing recording.

In the case of the present embodiment, the system control unit 30 restricts usage of the video encoders 35A and 35B in the event that the copy control information which is the decoding output of the WM decoding unit 39 is either forbidding copying or permitting copying with limitations. That is, with the present embodiment, the system control unit 30 performs control so as to always select the video data standard encoder 35S in the event that the copy control information detected by the WM decoding unit 39 is either forbidding copying or permitting copying with limitations, regardless of the selection instruction of the encoder made by the user with the key operating unit 38.

Thus, in the case of permitting copying with limitations, even though recording is executed to the disk 200 by the writing unit 37, the picture data subjected to compression encoding by the standard encoder 35S is recorded, so states can be prevented wherein detection of the electronic watermark information is difficult or impossible at the time of reproducing and decoding the recorded picture data, since such a state would mean that copy generation limitation control would not work effectively.

Figure 9:
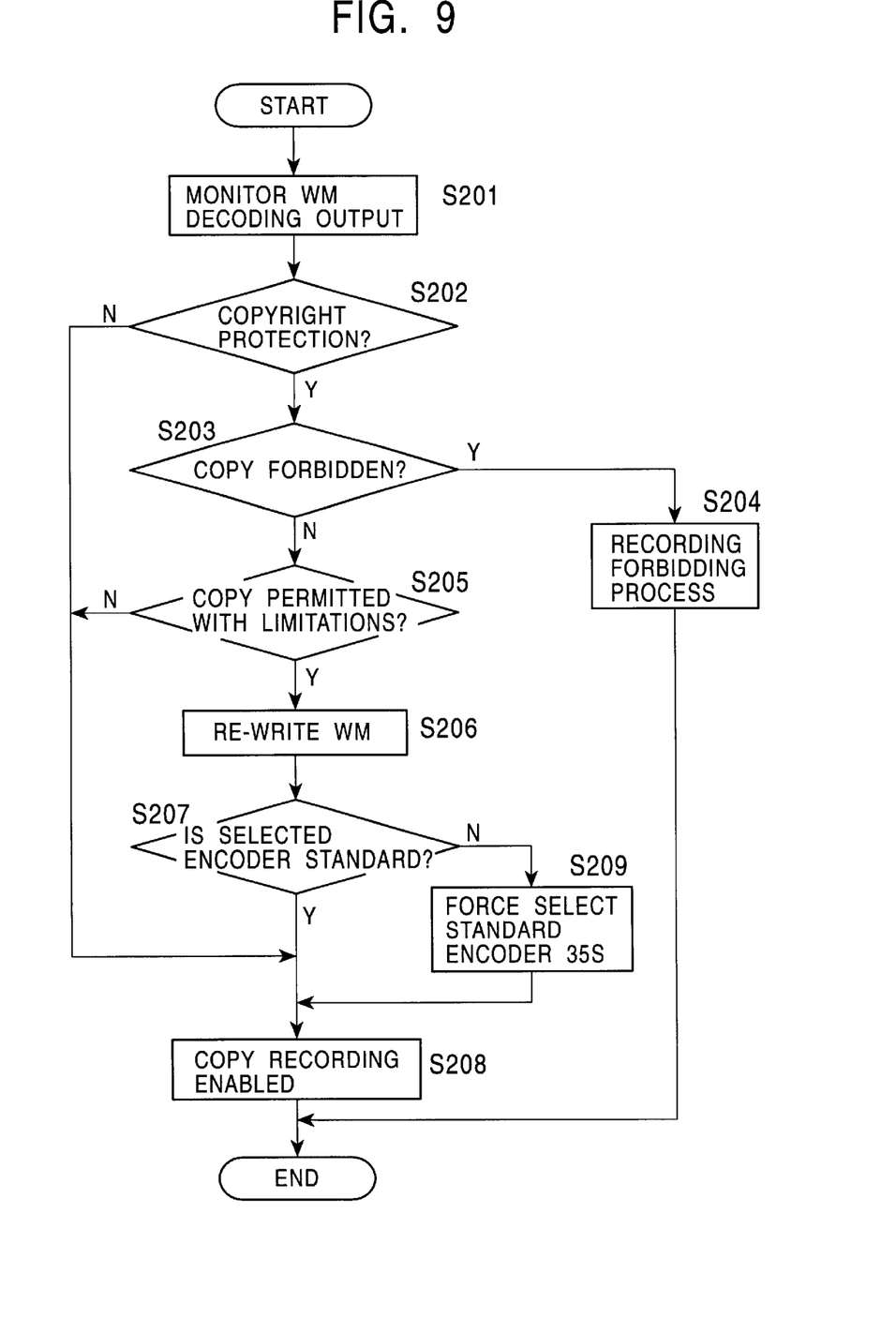
FIG. 9 is a flowchart for describing the operation of the principal portions of an embodiment of the information signal recording device according to the present invention.

FIG. 9 is a flowchart illustrating the flow of the processing at the system control unit 30 of this recording device.

First, the system control unit 30 takes in the electronic watermark information WM judgement results from the WM decoding unit 39 (step S201), and judges whether or not there is copyright protection information superimposed on the input picture signals (step S202). The recording control unit 34 is set in a copy recording enabled state in the event that there is no copyright protection information detected as a result of this judgement (step S208).

In the event that judgement is made in step S202 that there is copyright protection information superimposed on the picture signals, the output of the WM decoding unit 39 is checked, and judgment is made regarding whether the copy control information represents "Never Copy" or "No More Copy" (step S203).

In the event that the results of the judgement indicate that the copy control information represents forbidding copying, the system control unit 30 controls the recording control unit 34 and forbids recording processing (step S204).

In the event that the results of the judgement indicate that the copy control information does not represent forbidding copying, judgment is made regarding whether the copy control information represents limited copying permission "Copy Once" (step S205). Then, in the event that the results of the judgement indicate that the copy control information does not represent limited copying permitted, judgement is made that the state is "Copy Free", so the flow proceeds to step S208, and sets the recording control unit 34 to a recording enabled state.

Also, in the event that the state is limited copying permitted, the WM rewriting unit 33 is controlled to perform a processing wherein electronic watermark information WM for "No More Copy" forbidding subsequent copying is superimposed on the picture signals to be recorded (i.e., processing for rewriting the electronic watermark information WM) (step S206).

Then, judgement is made regarding whether the compression encoder selected and specified by the user is the standard encoder 35S (step S207), and in the event that the selected and instructed compression encoder is the standard encoder 35S, the flow proceeds to step S208 and sets the recording control unit 34 to a copy recording enabled state. In the event that the results of the judgement in step S207 show that the selected and instructed compression encoder is not the standard encoder 35S, the flow proceeds to step S209 and force-sets the encoder to use to the standard encoder 35S, then proceeds to step S208 and sets the recording control unit 34 to a copy recording enabled state.

Incidentally, at this time, an arrangement may be used wherein an audio message or text message on the display is delivered to the user, to the effect of "The specified encoder cannot be used due to protection of copyright protection information. The standard encoder 35S will be used."

Thus, according to the recording device of the present embodiment, compression encoding processing at the time of compressing and encoding the picture signals for recording which would make detection of the electronic watermark copyright protection information superimposed on the picture signals difficult or impossible is restricted based on the copyright protection information, so states wherein copyright protection becomes difficult or impossible regarding the picture signals following recording can be prevented.

Incidentally, with the above recording device of the present embodiment, an arrangement is employed wherein the standard encoder 356S is forcibly used in the event of limited copy permission, so that copying recording can be performed, but instead an arrangement may be used for example wherein the user is notified that the specified encoder cannot be used due to copyright protection, and prompted to select the standard encoder. In this case, copy recording would be forbidden in the event that the user does not select the standard encoder.

Incidentally, the present invention is by no means restricted to reproducing devices and recording devices such as described above; rather, the present invention can be applied to signal processing devices such as special effect devices, format conversion devices, and so forth, which perform signal processing of image signals, based on the copyright protection information in the signal processing thereof. Also, the present invention can be applied to relay devices for picture signals being transferred over networks, which perform such special effects or format conversion, or perform temporary decoding and re-encoding, etc.

Also, the encoding processing is not limited to compression encoding; rather, other various types of encoding processing are the object thereof, and any sort of encoding processing wherein the format of the electronic watermark information is changed thereby is restricted in regard to signal processing in the same manner as described above.

Also, the present invention is equally applicable to cases wherein picture information is taken into a computer and subjected to various types of signal processing.

Also, though the above description has been made regarding picture signals alone, the present invention is by no means restricted to such; rather, it is needless to say that the present invention is similarly applicable to audio signals and computer data.

Also, though the description has been made regarding cases of using spectrum dispersion for the electronic watermark information, the present invention is by no means restricted to such; rather, it is needless to say that other various types of processing methods can be used.

Further, it is needless to say that the method of adding copyright protection information to the information signals is not restricted to electronic watermark processing, and that other various types of methods can be used.

As described above, according to the present invention, signal processing regarding information signals to which copyright protection information is added which would make detection of copyright protection information difficult or impossible is restricted, based on the copyright protection information, thereby preventing states wherein copyright protection information is not detected, and enabling copyright protection of information signals to be carried out in a sure manner.

Also, the fact that such signal processing which would make detection of copyright protection information difficult or impossible is restricted, based on the copyright protection information, means that there is no need to provide means for detecting the copyright protection information in a sure manner for each type of signal processing, thus preventing increased circuit size and increased costs. Moreover, even in the event that new functions and signal processing methods are developed in the future, the present invention is capable of easily introducing those new functions and signal processing methods, while maintaining copyright protection.

What is claimed is:

1. A copyright protection information protecting method wherein signal processing is performed on information signals to which copyright protection information has been added, comprising the steps of:

detecting said copyright protection information from said information signals;

determining whether the detected copyright protection information places any limitation on subsequent copying of the information signals;

determining that the signal processing includes degrading signal processing that would render subsequent detection of the copyright protection information difficult; and upon determining that a limitation is present and that a degrading signal processing is present performing control to restrict signal processing to only signal processing that does not make detection of said copyright protection information difficult.

2. The copyright protection information protecting method according to claim 1, wherein said copyright protection information is added to said information signals as electronic watermark information by electronic watermark processing, and said degrading said signal processing changes a format of said electronic watermark information.

3. The copyright protection information protecting method according to claim 1, wherein said information signals are image signals, and said degrading signal processing is processing that changes a number of pixels, a number of lines, a position of pixels, or a position of lines within images rendered with said image signals.

4. The copyright protection information protecting method according to claim 1, wherein said information signals are image signals, and said degrading signal processing is processing that involves pruning processing or interpolation processing.

5. The copyright protection information protecting method according to claim 1, wherein said information signals are image signals, and said degrading signal processing is processing that enlarges images rendered with said image signals.

6. The copyright protection information protecting method according to claim 1, wherein said information signals are image signals, and said degrading signal processing is signal processing performed during image rotation processing, image inversion processing, image cropping processing, image shifting processing, encoding processing, format conversion processing, filtering processing, or reproduction of images rendered with said image signals at a different speed.

7. An information signal reproducing method, comprising the steps of:
reading out information signals to which copyright protection information has been added;
detecting said copyright protection information from said read information signals;
determining whether the detected copyright protection information places any limitations on subsequent copying of the information signal;
determining whether any signal processing includes degrading signal processing that would render subsequent detection of the copyright protection information difficult;
upon determining that a limitation is present and that a degrading signal processing is present performing control to restrict processing of said information signals to only signal processing that does not make detection of said copyright protection information difficult; and
subjecting said read information signals to predetermined signal processing other than the degrading signal processing, based on said control.

8. An information signal recording method, comprising the steps of:
detecting copyright protection information from information signals;
determining whether the detected copyright protection information places any limitations on subsequent copying of the information signal;
determining whether any signal processing includes degrading signal processing that would render subsequent detection of the copyright protection information difficult;
upon determining that a limitation is present and that a degrading signal processing is present performing control to restrict processing of said information signals to only signal processing that does not make detection of said copyright protection information difficult;
subjecting information signals to which said copyright protection information has been added to predetermined signal processing other than the degrading signal processing, based on said control; and
recording said information signals subjected to said predetermined signal processing.

9. An information signal output method, comprising the steps of:
detecting copyright protection information from information signals;
determining whether the detected copyright protection information places any limitations on subsequent copying of the information signal;
determining whether any signal processing includes degrading signal processing that would render subsequent detection of the copyright protection information difficult;
upon determining that a limitation is present and that a degrading signal processing is present performing control to restrict processing of said information signals to only signal processing that does not make detection of said copyright protection information difficult;
subjecting information signals to which said copyright protection information has been added to predetermined signal processing other than the degrading signal processing, based on said control; and
outputting said information signals subjected to said predetermined signal processing.

10. An information signal processing device for subjecting information signals to which copyright protection information has been added to processing in signal processing units, said information signal processing device comprising:
detecting means for detecting said copyright protection information from said information signals including means for determining whether the detected copyright protection information places any limitation on subsequent copying of the information signals and means for determining whether the signal processing units perform degrading signal processing that would render subsequent detection of the copyright protection information difficult; and
control means for performing control to restrict signal processing to only signal processing that does not make detection of said copyright protection information difficult, based on an output of said detecting means.

11. The information signal processing device according to claim 10, wherein said copyright protection information is added to said information signals as electronic watermark information by electronic watermark processing, and said degrading signal processing changes a format of said electronic watermark information.

12. The information signal processing device according to claim 10, wherein said information signals are image signals, and said degrading signal processing is signal processing that changes of a number of pixels, a number of lines, a position of pixels, or a position of lines within images rendered with said image signals.

13. The information signal processing device according to claim 10, wherein said information signals are image signals, and said degrading signal processing is signal processing that involves pruning processing or interpolation processing.

14. The information signal processing device according to claim 10, wherein said information signals are image signals, and said degrading signal processing is signal processing that enlarges images rendered with said image signals.

15. The information signal processing device according to claim 10, wherein said information signals are image signals, and said degrading signal processing is signal processing performed during image rotation processing, image inversion processing, image cropping processing, image shifting processing, encoding processing, format conversion processing, filtering processing, or reproduction of images rendered with said image signals at a different speed.

16. An information signal reproducing device, comprising:

reading means for reading out information signals to which copyright protection information has been added;

signal processing means for subjecting said information signals read out by said reading means to signal processings including a predetermined signal processing and a degrading signal processing that would render subsequent detection of the copyright protection information difficult;

detecting means for detecting said copyright protection information from said information signals read out by said reading means including means for determining whether the detected copyright protection information places any limitation on subsequent copying of the information signals and means for determining whether the signal processing units perform degrading signal processing that would render subsequent detection of the copyright protection information difficult; and controlling means for performing control, upon determining that a limitation is present and that a degrading signal process is present, to restrict said signal processing means in performing processing of said information signals to only signal processing that does not make detection of said copyright protection information by said detecting means difficult.

17. An information signal recording device, comprising:

recording means for recording information signals to which copyright protection information has been added;

signal processing means for subjecting said in formation signals to which said copyright protection information has been added to signal processings including a predetermined signal processing and a degrading signal processing that would render subsequent detection of the copyright protection information difficult, prior to recording by said recording means;

detecting means for detecting said copyright protection information from said information signals including means for determining whether the detected copyright protection information places any limitation on subsequent copying of the information signals and means for determining whether the signal processing units perform degrading signal processing that would render subsequent detection of the copyright protection information difficult; and controlling means for performing control to restrict said signal processing means in performing said predetermined signal processing on said information signals the predetermining to only signal processing that does not make detection of said copyright protection information by said detecting means difficult.

18. An information signal re cording device, comprising:

output means for outputting information signals to which copyright protection information has been added;

signal processing means for subjecting said information signals to which copyright protection information has been added to signal processings including a predetermined signal processing and a degrading signal processing that would render subsequent detection of the copyright protection information difficult, prior to output by said output means;

detecting means for detecting said copyright protection information from said information signals including means for determining whether the detected copyright protection information places any limitation on subsequent copying of the information signals and means for determining whether the signal processing units perform degrading signal processing that would render subsequent detection of the copyright protection information difficult; and controlling means for performing control to restrict said signal processing means in performing said predetermined signal processing on said information signals to only the predetermined signal processing that does not make detection of said copyright protection information by said detecting means difficult.

* * * * *